Patented Oct. 9, 1934

1,976,010

UNITED STATES PATENT OFFICE 1,976,010

AZO DYE AND METHOD FOR ITS PREPARATION

Miles Augustinus Dahlen, Wilmington, Del., assignor to E. I. du Pont de Nemours & Company, Wilmington, Del., a corporation of Delaware No Drawing. Application June 30, 1932, Serial No. 620,285

12 Claims. (Cl. 260—76)

This invention relates to new azo dyestuffs which are insoluble in water and yield valuable pigment dyes or fast dyeings and printings when prepared on the fiber.

It is an object of this invention to prepare azo dyes which exhibit good fastness to washing, light and chlorine. Another object is to prepare azo dyes which impart beautiful bright colors to the material dyed and which may be produced either as insoluble pigments in aqueous solution or suspension, or on the fiber. Additional objects will appear hereinafter.

These objects are attained by the process of the present invention wherein an arylamide of beta-hydroxy-naphthoic acid having the following general formula:

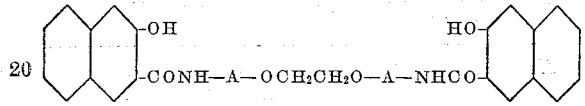

in which A represents a benzene nucleus which may have groups substituted thereon such as halogen, alkyl, alkoxy, and nitro, is coupled with a diazotized aromatic amine which is free from any group rendering the dyestuff water soluble.

The dyes produced thereby have the following general formula:

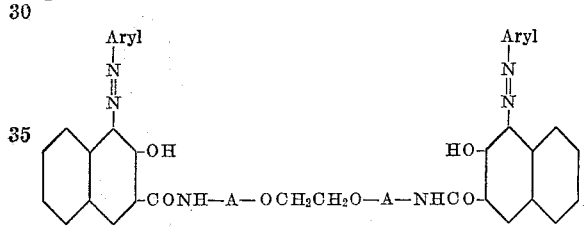

in which Aryl represents benzene, diphenyl, diphenylamine, naphthalene, anthraquinone, azo- benzene, or carbazole, which contains no group, such as the sulfonic acid or carboxylic acid group, which would render the dyestuff water soluble, but which may contain groups such as alkyl, alkoxy, halogen, nitro, and benzoylamino; and A has the same meaning as in the preceding paragraph.

In order to more completely understand the present invention reference may be had to the following examples in which the quantities are stated in parts by weight:

Example 1

Cotton yarn, after being well boiled and dried, was impregnated thoroughly with an aqueous padding liquor containing in one liter 10 parts of the di-(2-3-hydroxy-naphthoyl)-derivative of the di-(para-amino-phenyl)-ether of ethylene-glycol, 10 parts of caustic soda of 40% strength, and 40 parts of Turkey red oil of 50% strength. The yarn was then wrung out and developed without drying in a diazo solution prepared as follows:

16.5 parts of 2-5-dichloroaniline were boiled with 100 parts of water containing 50 parts of hydrochloric acid of 20° Bé. The solution was cooled, 200 parts of ice were added, and then 8 parts of sodium nitrite of 95% strength dissolved in 30 parts of water were gradually added. When diazotization was complete, the solution was filtered. The solution was then treated with enough sodium acetate to neutralize the mineral acidity.

After the development of the dyestuff in the above bath was completed, the yarn was rinsed and then soaped in boiling water. Upon further rinsing and drying, a bright scarlet dyestuff was obtained possessing very good fastness to chlorine, boiling water and light. Following is the probable formula of the dyestuff:

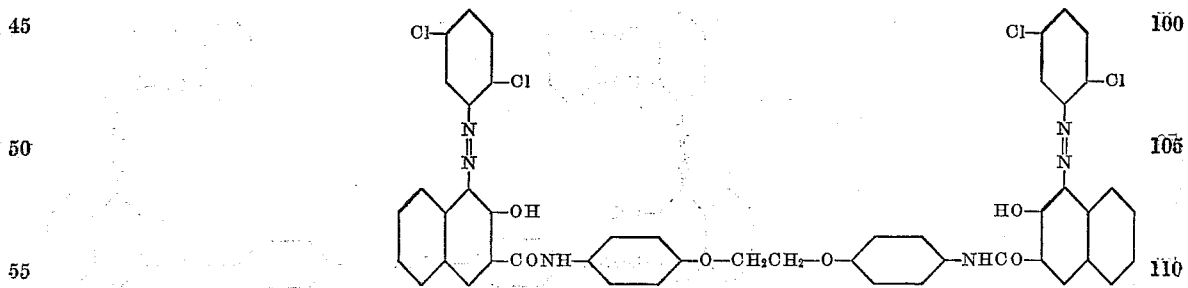

Example 2

Cotton yarn which had been well boiled and dried was impregnated with a grounding liquor containing in one liter 10 parts of the di-(2-3-hydroxy-naphthoyl)-derivative of the di-(4-chloro-2-amino-phenyl)-ether of ethylene-glycol, 10 parts of caustic soda of 40% strength, and 10 parts of Turkey red oil. The yarn was then rinsed, wrung as dry as possible, and developed in a diazo solution prepared as follows:

17 parts of 4-chloro-2-nitro-aniline were dissolved at 80–90° C. in 30 parts of sulfuric acid (66° Bé.). The solution was then poured into cold water and ice with stirring and diazotized at a low temperature with a solution of sodium nitrite, in the usual manner. Before use, the diazo solution was made neutral to Congo red paper by the addition of sodium acetate.

When the development of the dyestuff was complete, the yarn was rinsed, boiled with a soap solution, rinsed further and dried. The dyestuff produced was a brilliant scarlet, fast to light and washing. The probable formula of the color is given below:

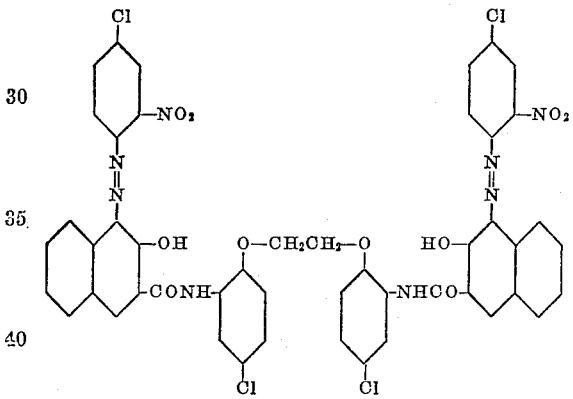

As will be readily understood, the number of dyestuffs prepared according to the present invention is very large. The following table cites a few representative examples and includes a description of the shades produced on cotton materials.

| Example No. | Developed with the diazo from— | Combined with the di-(2:3-hydroxy-naphthoyl)-derivative of the following diether of ethylene glycol | Shade |
|---|---|---|---|
| 3 | Meta-chloro-aniline | 4-chloro-2-amino-phenyl | Orange. |
| 4 | 1-amino-4-benzoyl-amino-2,5-dimethoxy-benzene | ....do.... | Blue. |
| 5 | 4-nitro-2-amino-anisole | ....do.... | Reddish scarlet. |
| 6 | 2,5-dichloro-aniline | 2-methoxy-4-amino-phenyl | Scarlet. |
| 7 | 5-nitro-2-amino-anisole | ....do.... | Bluish-red. |
| 8 | 3-amino-carbazole | ....do.... | Bluish-black. |
| 9 | 1-amino-4-benzoyl-amino-2,5-dimethoxy-benzene | Ortho-amino-phenyl | Blue. |
| 10 | Meta-chloroaniline | ....do.... | Orange. |
| 11 | 4-nitro-2-amino-anisole | ....do.... | Reddish-scarlet. |
| 12 | 2,5-dichloroaniline | ....do.... | Yellowish-scarlet. |
| 13 | 5-nitro-2-amino-anisole | ....do.... | Bluish-red. |
| 14 | Meta-chloro-aniline | Para-amino-phenyl | Orange. |
| 15 | 5-nitro-2-amino-anisole | ....do.... | Bluish-red. |
| 16 | Ortho-phenetole-azo-alpha-naphthylamine | ....do.... | Blue-black. |
| 17 | 2-nitro-4-methyl-benzene-azo-cresidine | ....do.... | Corinth. |
| 18 | 3-nitro-4-amino-toluene | ....do.... | Scarlet. |
| 19 | 1-amino-4-benzoyl-amino-2,5-dimethoxy-benzene | ....do.... | Deep blue. |
| 20 | Alpha-naphthylamine | ....do.... | Maroon. |
| 21 | Alpha-amino-anthraquinone | ....do.... | Red. |
| 22 | Ortho-dianisidine | ....do.... | Blue. |
| 23 | 4,4′-diamino-diphenylamine | ....do.... | Blue-black. |

All of the above dyestuffs show good to excellent fastness to light, chlorine and hot soaping. Those prepared from the di-para-amino-phenyl ether show in general the best fastness to light.

The probable formulas of the respective dyestuffs follow from their mode of preparation. For example No. 19, probably possess the constitution:

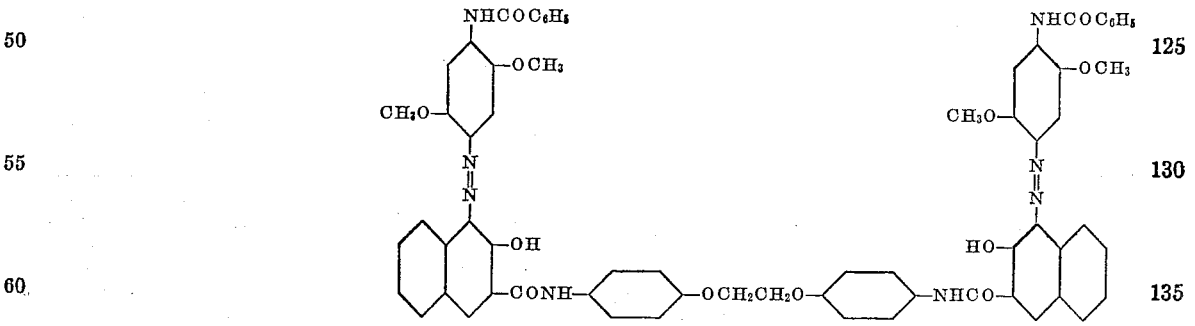

Similarly, No. 21 has the probable constitution:

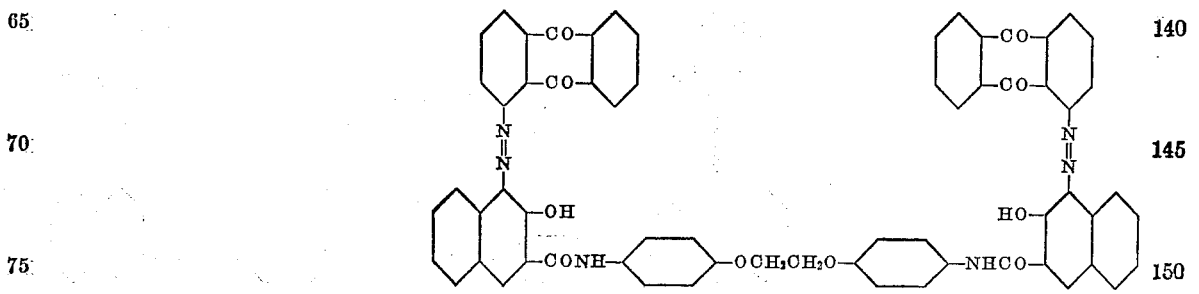

In practicing the present invention the aromatic amine may have various groups substituted thereon provided that these groups do not render the resulting dye water soluble. Also, as above mentioned, the nucleus represented by A may have groups substituted thereon such as halogen, alkyl, alkoxy, and nitro.

The arylamides of beta-hydroxy-naphthoic acid may be prepared by any of the well known methods, some of which are described in copending application No. 438,913, filed March 25, 1930.

The products of the present invention are characterized by a satisfactory fastness to washing, light and chlorine. In addition, they impart brilliant colors to the dyed material.

As many apparently widely different embodiments of this invention may be made without departing from the spirit and scope thereof, it is to be understood that I do not limit myself to the specific embodiments thereof except as defined in the appended claims.

I claim:

1. A process for preparing water insoluble azo dyes which comprises coupling an arylamide of beta-hydroxy-naphthoic acid of the following general formula:

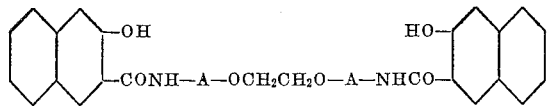

in which A represents a benzene nucleus, with a diazotized aromatic amine.

2. A process for preparing water in soluble azo dyes which comprises coupling an arylamide of beta-hydroxy-naphthoic acid of the following general formula:

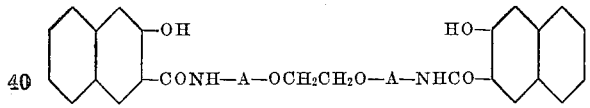

in which A represents a benzene nucleus, which may have substituted thereon members selected from the group consisting of halogen, alkyl, alkoxy, and nitro, with a diazotized aromatic amine selected from the group consisting of benzene, diphenyl, diphenylamine, naphthalene, anthraquinone, azobenzene and carbazole, which may have substituted thereon members selected from the group consisting of alkyl, alkoxy, halogen, nitro, and benzoyl-amino.

3. A process for preparing water insoluble azo dyes which comprises coupling an arylamide of beta-hydroxy-naphthoic acid of the following general formula:

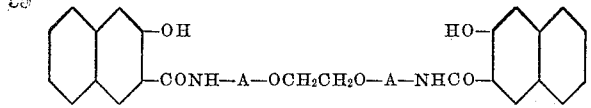

in which A represents a benzene nucleus, which may have substituted thereon members selected from the group consisting of halogen, alkyl, alkoxy, and nitro, with a diazotized aromatic amine of the benzene series which may have substituted thereon members selected from the class consisting of alkyl, alkoxy, halogen, nitro, and benzoyl-amino groups.

4. A process for preparing azo dyes which comprises coupling the di-2,3-hydroxy-naphthoyl derivative of the di-para-amino-phenyl-ether of ethylene-glycol with diazotized 2-5-dichloro-aniline.

5. A process for preparing azo dyes which comprises coupling the di-2,3-hydroxy-naphthoyl derivative of the di-4-chloro-2-amino-phenyl-ether of ethylene-glycol with diazotized 4-chloro-2-nitro-aniline.

6. A water insoluble azo dye having the following general formula:

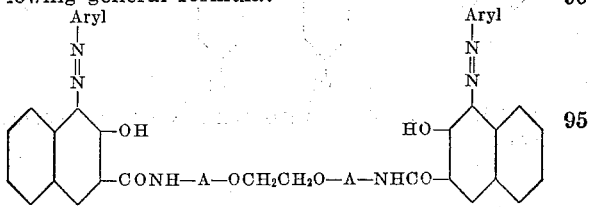

in which Aryl represents an aromatic nucleus, and A represents a benzene nucleus.

7. A water insoluble azo dye having the following general formula:

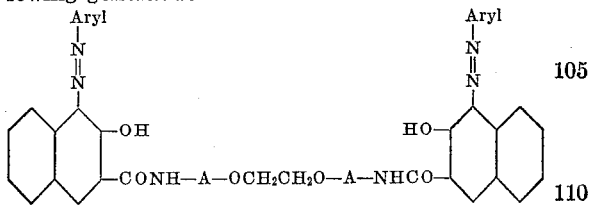

in which Aryl represents an aryl nucleus selected from the group consisting of benzene, diphenyl, diphenylamine, naphthalene, anthraquinone, azobenzene and carbazole, which may have substituted thereon members selected from the group consisting of alkyl, alkoxy, halogen, nitro, and benzoyl-amino, and A represents a benzene nucleus which may have substituted thereon members selected from the group consisting of halogen, alkyl, alkoxy, and nitro.

8. A water insoluble azo dye having the following general formula:

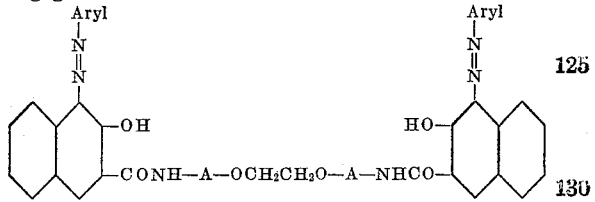

in which Aryl represents an aryl nucleus of the benzene series which may have substituted thereon members selected from the group consisting of alkyl, alkoxy, halogen, nitro, and benzoyl-amino, and A represents a benzene nucleus which may have substituted thereon members selected from the group consisting of halogen, alkyl, alkoxy, and nitro.

9. An azo dye having the following formula:

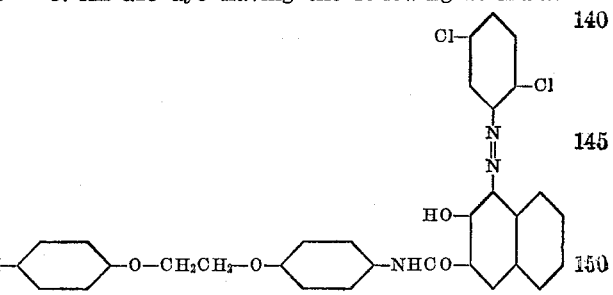

which dyes cotton yarn with a bright scarlet color.

10. An azo dye having the following formula:

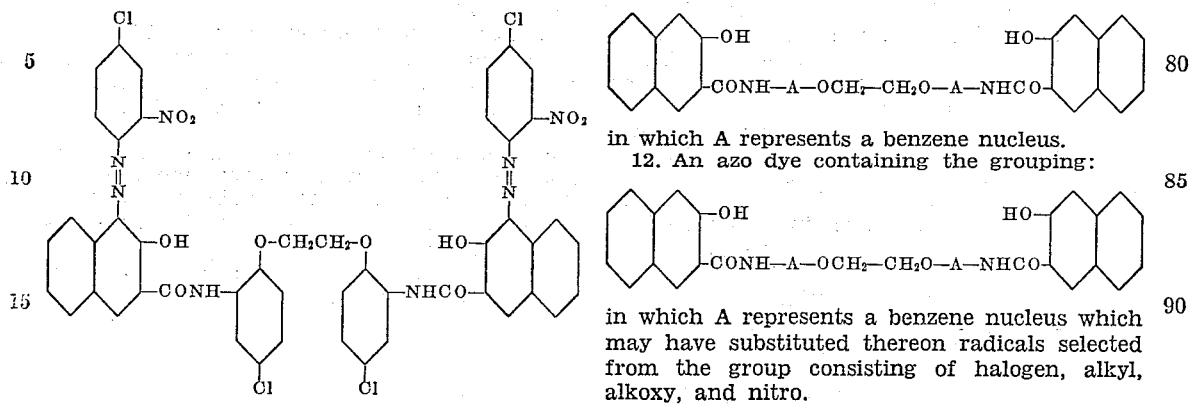

which dyes cotton yarn with a bright scarlet color.

11. A water insoluble azo dye containing the grouping:

in which A represents a benzene nucleus.

12. An azo dye containing the grouping:

in which A represents a benzene nucleus which may have substituted thereon radicals selected from the group consisting of halogen, alkyl, alkoxy, and nitro.

MILES AUGUSTINUS DAHLEN.